March 9, 1965

H. RISO 3,172,388

APPARATUS FOR PRODUCING A CABLE JACKET FROM CORRUGATED METAL TAPE

Filed Feb. 27, 1961

Inventor:
Hans Riso

Inventor:
Hans Riso

March 9, 1965

H. RISO 3,172,388

APPARATUS FOR PRODUCING A CABLE JACKET
FROM CORRUGATED METAL TAPE

Filed Feb. 27, 1961

Inventor:

Hans Riso

United States Patent Office 3,172,388
Patented Mar. 9, 1965

3,172,388
APPARATUS FOR PRODUCING A CABLE JACKET FROM CORRUGATED METAL TAPE
Hans Riso, Berlin-Charlottenburg, Germany, assignor to Siemens-Schuckertwerke Aktiengesellschaft, Berlin-Siemensstadt, Germany, a corporation of Germany
Filed Feb. 27, 1961, Ser. No. 91,672
Claims priority, application Germany, Feb. 29, 1960, S 67,332
7 Claims. (Cl. 113—127)

My invention relates to the production of cable jackets from metal tape.

Various methods have become known for providing an electric cable with a metal sheath or jacket formed of a longitudinally extending tape which is bent to tubular shape with overlapping edges and whose edges are soldered together in the overlapping range. According to these methods, the shaping of the tape to a tubular structure, the deposition of solder and fluxing agent, and the soldering operation can be performed in a single course of operations within one and the same machine. However, the known methods are either uneconomical or fail to produce reliably tight seams, particularly on cables whose jacket is formed of transversely corrugated metal tape.

It is an object of my invention to provide an improved method and apparatus that increases the economy of manufacturing operation and reliably secures a tight seal along the soldered seam even when using a transversely corrugated metal tape.

The invention is predicated upon the recognition that the production of a tightly soldered seam on such cables is dependent upon two requirements, namely the manner and moment of depositing the flux, and the manner of depositing the soldering metal. That these requirements are jointly essential will be more fully pointed out with reference to the methods heretofore known.

According to German Patent 25,575, a longitudinally extending, smooth metal tape is first bent to tubular shape with the overlapping seam located on top of the cable. Then the flux is caused to run from above onto the seam. Thereafter, the liquid solder is deposited and the seam is heated by a soldering iron to effect the first soldering operation with the aid of rollers which press the tape edges together. Thereafter, a second soldering iron is used for ultimate soldering, and the soldered jacket is subsequently drawn through a die. There is no assurance with this method that the flux and the liquid solder are uniformly distributed onto the mutually facing edges and marginal areas of the metal tape.

According to British Patent 7187/1909, a watertight jacket for electric conductors is produced from a wide tin-coated metal tape which extends along the conductor and has overlapping edges. The metal tape is first passed between two cushions impregnated with fluxing agent and is thereafter shaped to a helix by means of suitable shaping tools so as to form a jacket. The last operative shaping tool is heated to soldering temperature in order to solder the mutually contacting marginal areas of the helical metal tape to each other. The necessity for giving the metal tape the shape of a helix and the fact that the metal tape is coated with fluxing agent on both sides, render the method excessively difficult and expensive.

In the manufacture of cable jackets from transversely corrugated metal tape according to U.S. Patent 2,352,-325, the liquefied solder is fed through a tube to the overlapping seam. It is difficult to give the supply of solder the proper dosage and to make certain that the two tape edges facing each other in the overlapping range are uniformly coated with solder. Nothing is disclosed with respect to deposition of the fluxing agent.

In the production of cable jackets from transversely corrugated metal tape according to U.S. Patent 2,499,853, the corrugated tape is first bent to a tube with slight overlapping of the edges. Thereafter, the fluxing agent is supplied to the open seam from a container having a porous bottom, whereupon the seam is closed and heated. Then the heated soldering metal is pressed between the overlapping tape edges through a tube by means of a pump, and a layer of solder metal is also deposited upon the outer surface of the seam. In this method, the correct dosing of the fluxing agent as well as of the solder metal is a difficult matter.

The flux to be deposited upon the tape edges to be soldered together must have no corrosive effect upon the metal tape. This applies above all to cable jackets of the generally preferred type, consisting of tin-coated iron tape. Used as non-corrosive fluxing agents, for example, are those on alcohol-resin bases. In view of the fact that the deposited flux tends to run off and may then contaminate the contacting parts of the production machinery and in some cases also the cable core, resort has been taken to running between the mutually overlapping tape edges, a strip of solder metal which contains a core of fluxing agent. Such a solder strip is formed, for example, by passing an originally round flux-cored solder wire between flattening rollers. When using such a solder strip, however, the desired uniform wetting of the tape edges by the flux is not attained. It has been found that in this manner a satisfactorily tight solder seam cannot be produced. As a rule, therefore, the inevitable faulty and leaky spots in the solder seam are covered by covering the jacket with an adhesive coating or water-tight sheath of synthetic plastic, but reliable results can be obtained only by performing the soldering operation in such a manner as to reliably produce a tight seam in the first place.

It is a more specific object of my invention, therefore, to improve the above-mentioned methods toward a relatively simple yet reliable production of a solder seam which is tightly sealed along its entire extent.

The method of the invention, like those heretofore known, involves producing a cable jacket from a metal tape, preferably transversely corrugated, which extends along the cable core and is bent to a tubular shape around the core so that the overlapping seam of the tape edges is located on top. Furthermore, a solder-metal strip is caused to run between the mutually overlapping tape edges, and the edges are then welded or soldered together by application of pressure and heat.

In accordance with a feature of my invention and in distinction from the known methods, however, a fluxing agent is sprayed by spray nozzles onto the areas of the metal tape that are to be soldered together; and the spray-deposition of the flux is immediately prior to bending the tape to tubular shape. This affords the assurance that only the portions of the metal tape that face each other in the overlapping seam are covered with flux and that a uniformly distributed and extremly thin coating of flux is produced. The spray-deposition of the fluxing agent by means of nozzles is particularly important in the production of the cable jacket from transversely corrugated metal tape, because it affords covering all wave bottoms and wave peaks of the jacket with a uniform coat of flux.

Tests made with cables produced according to the invention have shown that a completely tight soldering seam is obtained in this manner. This is particularly significant for electric communication cables that are subjected to supervision by fluid pressure, and also for communication cables that contain hygroscopic insulating materials such as paper.

For such purposes in particular, the rather simple method and equipment according to the invention afford outstanding economical and technological improvement. It is especially advantageous to insert a solder-metal strip between the tape edges spray-coated with fluxing agent, which strip contains a core of fluxing agent in the manner known as such. In this case, the flux within the solder strip and the flux spray-coated upon the tape edges may be of respectively different types.

According to another feature of my invention, the apparatus for producing longitudinally soldered, transversely corrugated metal jackets on cables is provided with two spray nozzles for depositing the fluxing agent, one nozzle being disposed beneath one edge of the tape, whereas the other is mounted above the other edge of the tape. It is preferable to mount the two spray nozzles on pivots in order to permit turning them at any time from active to inactive position and vice versa.

According to another feature of my invention, respective containers for cleaning fluid are disposed at the spray nozzles in order to keep them clean during operation, the nozzles being immersed in the cleaning fluid when placed to inactive position.

Care must be taken that the transversely corrugated metal tape passing into the machine is coated with the fluxing agent at the overlapping areas from the very beginning of the tape travel through the machine. Preferably therefore, the machine is put into operation only after the spraying operation of the nozzles is initiated, this sequence being preferably effected automatically.

The invention will be further explained with reference to the embodiment of a cable-jacket soldering machine according to the invention illustrated by way of example on the accompanying drawings in which.

Figure 4:
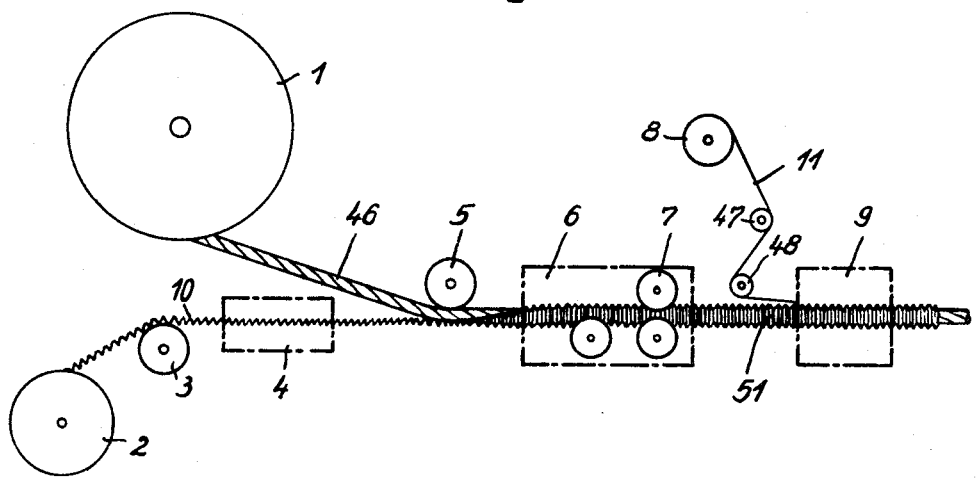
FIG. 4 is a schematic diagram of the entire cable jacketing apparatus.

Referring first to FIG. 4, the electric cable to be jacketed is supplied from a reel 1. Simultaneously, another reel 2 supplies a metal strip 10 which, before joining the cable 46, passes over a guide roller 3 through a flux-applying apparatus 4 more fully shown in FIG. 1 to be described hereinafter. The cable 46, passing over a guide roller 5, joins the flux-coated strip 10 and both pass through a bending assembly 6 where the strip is bent about the cable, for example, by bending rollers as schematically shown at 7. Thereafter, the cable-and-jacket assembly is provided with a strip 11 of solder metal supplied from a reel 8, whereafter the jacket is completed by soldering in a unit 9 described below with reference to FIG. 2.

Figure 1:
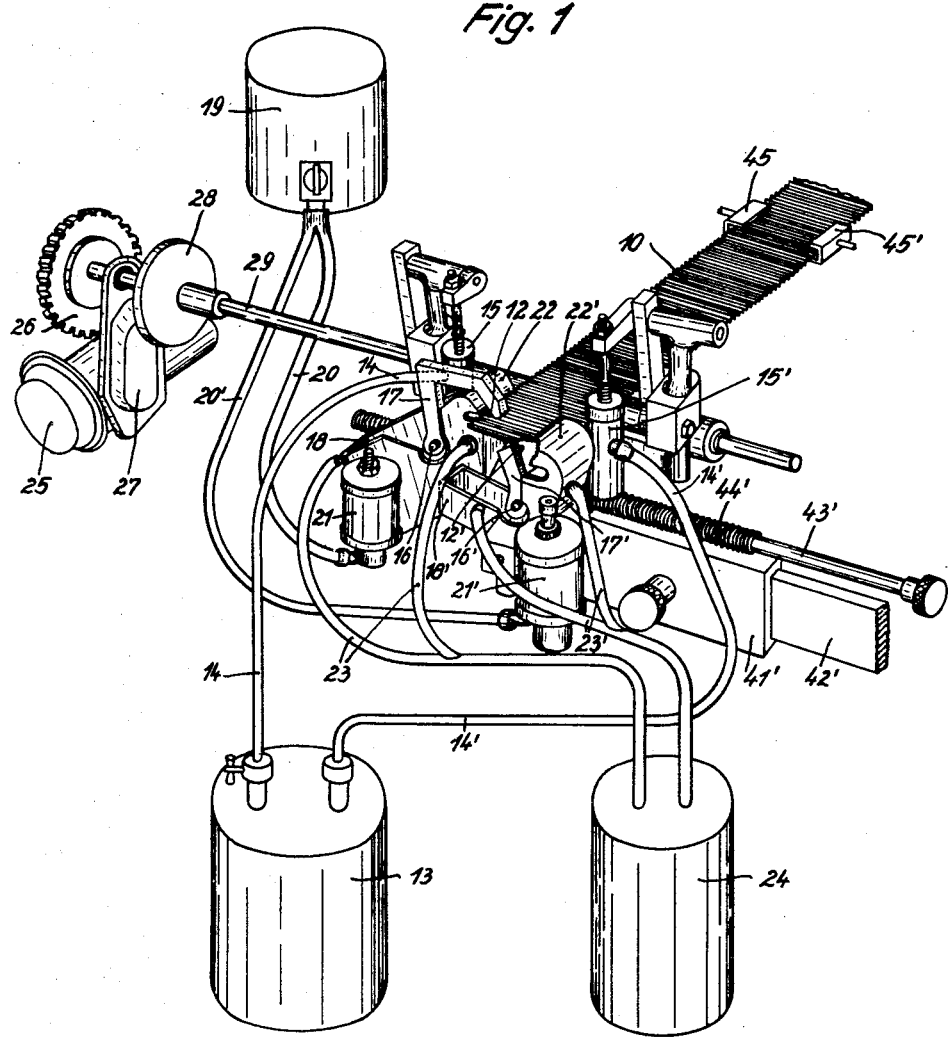
FIG. 1 is a perspective and schematic view of the apparatus portion in which the overlapping areas of the corrugated tape are coated with fluxing agent.
Figure 2:
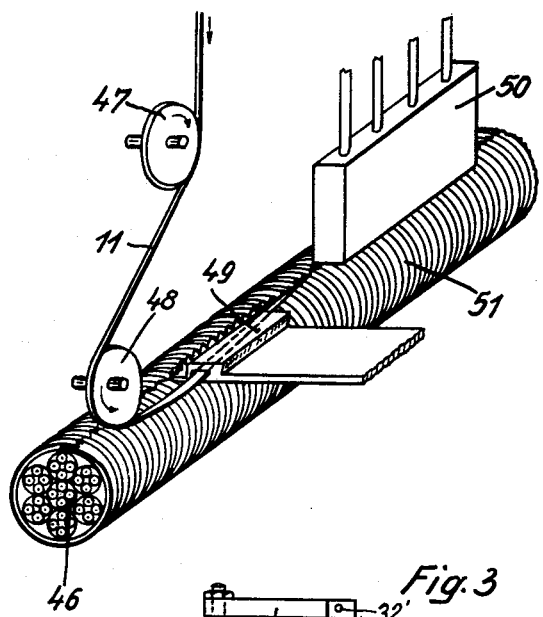
FIG. 2 shows the portion of the apparatus that serves for supplying a strip of soldering metal and effecting the soldering.

According to FIG. 1, the flux-applying apparatus (4 in FIG. 4) comprises two spray nozzles 12 and 12' for depositing the fluxing agent upon the corrugated metal tape 10. The spray nozzle 12 is located above one of the two edges of the tape. The other nozzle 12' is located beneath the other edge of tape. The liquid fluxing agent is kept under pressure in a container 13 and passes through pipes 14 and 14' to respective valves 15 and 15'. The valves are connected by tubes (not visible) with the respective tubular pivot shafts 16 and 16' of the two nozzles. The nozzles proper are mounted on respective hollow swing arms 17 and 17' which communicate with the tubular pivot shafts 16 and 16' through suitable bores so that the fluxing agent passes from valves 15, 15' through the hollow shafts 16, 16' and the hollow swing arms 17 and 17' to the respective spray nozzles 12 and 12'.

FIG. 1 shows the spray nozzles 12 and 12' in active position. In order to render the nozzles inactive, they are turned about the pivot shafts 16 and 16' to such an extent that they become immersed in cleaning fluid contained in respective containers 18 and 18'. The cleaning fluid is supplied to containers 18 and 18' from a storage tank 19 through respective tubes 20 and 20' and respective float-valve housings 21 and 21'. The valve housings are hydraulically connected in parallel relation to the respective containers 18 and 18' in order to automatically maintain the level of cleaning fluid in the containers 18 and 18' at the required height, by controlling the supply of fluid by the respective float valves in housings 21 and 21'. When the swing arms 17 and 17' are turned into the containers 18 and 18', the cleaning fluid displaced thereby passes through flexible hoses 23 and 23' into a collecting tank 24. When the spray nozzles are in operation, any excessive amount of flux resulting from the spraying operation is first caught by baffles or trays 22 and 22' and is thence returned through the same hoses 23 and 23' respectively to the collecting tank 24. The catch trays or baffles 22, 22' and the cleaning-fluid containers 18 and 18' are separated from each other by a liquid-tight partition.

Figure 3:
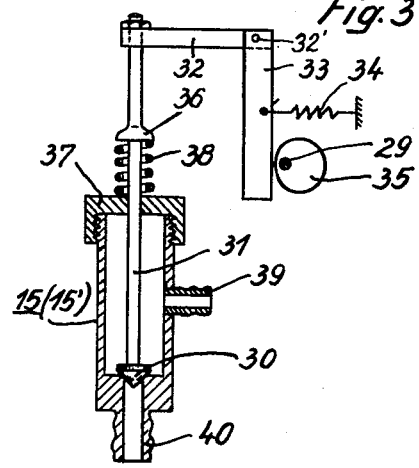
FIG. 3 illustrates a control valve and the appertaining control components, the valve being built into the flux supply pipe of the equipment.

The pivotally mounted spray nozzles 12, 12' and the valves 15, 15' are actuated by a drive motor 25 which is coupled with a control shaft 29 through a spur gear 26, a switching mechanism 27 and a frictional slip clutch 28. The switching mechanism 27 has the purpose to properly control the drive motor 25 as to its limits positions and to issue switching commands to other parts of the apparatus. Thus, the switching mechanism 27, acting through the control shaft 29 and through pairs of bevel gears (not visible) mounted on this shaft and on the pivot shafts 16 and 16' respectively, performs the desired pivotal displacement of the nozzles to the active or inactive positions, as may be desired at a time. Furthermore, by means of cams or dog pins mounted on shaft 29, the valves 15 and 15' are actuated as will be explained hereinafter with reference to FIG. 3.

The switching mechanism 27 further serves to automatically initiate the operation of the machine after the spray nozzles have been turned to the operating position. This affords the assurance that the tape 10, when running into the machine, is uniformly spray-coated at the overlapping tape edges with the fluxing agent from the very beginning of the fabricating operation. The operation of the entire machinery is preferably so effected that when the machinery is switched on, only the drive motor 25 is first put in operation and turns the spray nozzles to the operating position and then initiates the supply of fluxing agent by means of the valves 15 and 15', whereafter the other components of the machinery are switched on.

Each valve housing 15, 15' comprises a conical valve member 30 (FIG. 3) mounted on a valve tappet rod 31 whose upper end is linked to a lever arm 32 pivoted at 32'. The arm 32 forms part of an angular lever whose other arm 33 is biased by a spring 34 against a cam 35 fastened on the control shaft 29. A helical compressive spring 38 is mounted between a shoulder 36 of the valve rod 31 and the cover 37 of the valve housing and tends to press the rod 31 and the valve member 30 in the upward direction. The valve housing has a lateral nipple 39 to which the pipe 14 or 14' is connected, and a bottom nipple 40 connected to the tubes leading to the hollow pivot shafts 16 and 16'.

The spray nozzles and preferably also the parts of the apparatus connected therewith, namely the containers 18 and 18' and the trays 22 and 22', are displaceable transversely of the travelling direction of the metal tape 10. This permits adjusting the apparatus for respectively different widths of the metal tape 10. In the illustrated embodiment, these components of the apparatus are mounted on separate transverse carriers of which only one carrier 41 is visible. The hollow carrier 41 is displaceable on a transverse rail 42 and is adjustable by means of a captive but revolvable screw spindle 43' whose threaded portion 44 engages the carrier 41 so that the carrier is displaced when turning a knob of spindle 43'.

The metal tape 10 is guided in glide shoes 45 and 45' that are adjustable in the transverse direction. After the tape, thus guided, has passed through the apparatus shown in FIG. 1, it is subsequently bent to tubular shape around the cable core 46 (at 6 in FIG. 4) so that the tape edges overlap each other. Thereafter, a strip 11 of solder material (FIGS. 2 and 4) runs over guide roller 47, 48 into a guide member 49 which also serves for somewhat lifting the upper edge of the metal tape to facilitate passing the solder strip between the overlapping marginal areas. Thereafter, the entire assembly passes through an electric soldering device 50 (at 9 in FIG. 4) by means of which the overlapping area, including the solder strip, is heated up to the melting temperature of the solder, and thus is soldered under pressure, and subsequently cooled. Such devices are known as such, for example, from German Patent 1,013,370. The cable jacket or sheath thus tightly soldered is denoted by 51. It will be recognized that the diameter and perimeter of the metal jacket 51 are shown on enlarged scale in FIG. 2, in comparison with the width of the metal tape 10 as illustrated in FIG. 1. The metal jacket may be enveloped in a sheath of synthetic material which is preferably water-tight, an adhesive coating being employed if necessary for obtaining a completely sealed, insulating enclosure.

In practice, it is preferable to guide the metal tape into the apparatus portion shown in FIG. 1 by guiding rollers, rails or the like members located on both sides of the tape. It will also be obvious to those skilled in the art, upon studying this disclosure, that my invention affords of a variety of other modifications and hence may be given embodiments other than particularly illustrated and described herein, without departing from the essential features of my invention and within the scope of the claims annexed hereto.

I claim:

1. In apparatus for jacketing an electric cable, comprising feeding means for supplying a cable core, strip supply means for passing a corrugated metal strip alongside the cable core, means for bending the strip about the core to form a tubular jacket with the longitudinal strip edges overlapping each other on top of the core, and soldering means for joining the overlapping edges together, the combination of a flux dispensing device located so as to dispense flux along an area between said strip supply means and said bending means ahead of the point where the strip meets the cable core, said device comprising two spray nozzles and flux supply means connected with said nozzles, one of said nozzles having a nozzle opening located beneath and directed toward one of the marginal areas of the strip to be soldered, and the other nozzle having an opening located above and directed toward the other marginal strip area to be soldered, said two nozzles including respective nozzle arms and means pivotally mounting said arms for deflection from an active spraying position directed toward the respective strip area to be soldered to an inactive position directed away therefrom, said device comprising two cleaning-fluid containers, said nozzles being pivotable on said mounting means so as to be immersed in said containers for cleaning flux from said nozzles when said respective nozzle arms are in said inactive position.

2. In cable jacketing apparatus according to claim 1, said nozzles being displaceable relative to each other in a direction transverse to the longitudinal direction of the strip for adapting said flux dispensing device to strips of respectively different widths.

3. In cable jacketing apparatus according to claim 1, said device comprising two float valves connected hydraulically in parallel relation to said respective containers to maintain a given fluid level therein.

4. In apparatus for jacketing an electric cable, comprising feeding means for supplying a cable core, strip supply means for passing a corrugated metal strip alongside the cable core, means for bending the strip about the core to form a tubular jacket with the longitudinal strip edges overlapping each other on top of the core, and soldering means for joining the overlapping edges together, the combination of a flux dispensing device located so as to dispense flux along an area between said strip supply means and said bending means ahead of the point where the strip meets the cable core, said device comprising two spray nozzles and flux supply means connected with said nozzles, one of said nozzles having a nozzle opening located beneath and directed toward one of the marginal areas of the strip to be soldered, and the other nozzle having an opening located above and directed toward the other marginal strip area to be soldered, said device comprising two baffles mounted near said respective nozzles for catching excess amounts of sprayed fluxing agent, hose means connected to said baffles, and a collecting tank with which said two baffles communicate through said hose means.

5. In cable jacketing apparatus according to claim 4, said two nozzles comprising respective nozzle arms and means pivotally mounting said arms for deflection from an active spraying position directed toward the respective strip area to be soldered to an inactive position directed away therefrom, two cleaning-fluid containers, said nozzles being located in said containers when said respective nozzle arms are in said inactive position, each of said two nozzles together with one of said respective containers and one of said respective trays forming a subassembly, and transverse mounting means for displacing said subassembly as an entity relative to the other subassembly in a direction transverse to the longitudinal direction of the strip for adapting said flux dispensing device to strips of respectively different widths.

6. In apparatus for jacketing an electric cable, comprising feeding means for supplying a cable core, strip supply means for passing a corrugated metal strip alongside the cable core, means for bending the strip about the core to form a tubular jacket with the longitudinal strip edges overlapping each other on top of the core, and soldering means for joining the overlapping edges together, the combination of a flux dispensing device located so as to dispense flux along an area between said strip supply means and said bending means ahead of the point where the strip meets the cable core, said device comprising two spray nozzles and flux supply means connected with said nozzles, one of said nozzles having a nozzle opening located beneath and directed toward one of the marginal areas of the strip to be soldered, and the other nozzle having an opening located above and directed toward the other marginal strip area to be soldered, each of said two nozzles comprising a tubular nozzle arm and a hollow pivot shaft on which said arm is mounted whereby said nozzle arm and nozzle can be turned from active to inactive position, said nozzle opening communicating with said flux supply means through said tubular arm and said hollow pivot shaft.

7. In apparatus for jacketing an electric cable, comprising feeding means for supplying a cable core, strip supply means for passing a corrugated metal strip alongside the cable core, means for bending the strip about the core to form a tubular jacket with the longitudinal strip edges overlapping each other on top of the core, and soldering means for joining the overlapping edges together, the combination of a flux dispensing device located so as to disperse flux along an area between said strip supply means and said bending means ahead of the point where the strip meets the cable core, said device comprising two spray nozzles and flux supply means connected with said nozzles, one of said nozzles having a nozzle opening located beneath and directed toward one of the marginal areas of the strip to be soldered, and the other nozzle having an opening located above and directed toward the other marginal strip area to be soldered, each of said two nozzles comprising a tubular nozzle arm and a hollow pivot shaft on which said arm is mounted whereby said nozzle arm and nozzle can be turned from active to inactive position, said nozzle opening communicating with said flux supply means through said tubular arm and said hollow pivot shaft, a control shaft geared to said two pivot shafts, and a motor in driving connection with said control shaft for turning said nozzles between said active and inactive positions.

References Cited by the Examiner

UNITED STATES PATENTS

| | | | |
|---|---|---|---|
| 1,253,906 | 1/18 | Sutter | 113—59 |
| 1,622,781 | 3/27 | Hansen | 113—95 |
| 2,063,470 | 12/36 | Staples | 29—474.1 |
| 2,088,446 | 7/37 | Specht | 29—474.1 |
| 2,090,744 | 8/37 | Boe | 29—474.1 XR |
| 2,499,853 | 3/50 | Eckel et al. | 113—59 |
| 2,515,097 | 7/50 | Schryber | 113—93 XR |
| 2,569,125 | 9/51 | Costantino | 239—112 XR |
| 2,957,440 | 10/60 | Schaefer | 113—93 |
| 2,964,007 | 12/60 | Buffington | 113—126 |
| 3,016,854 | 1/62 | Giles | 29—503 |
| 3,053,213 | 9/62 | Flynn | 113—95 |

FOREIGN PATENTS 479,281    2/38    Great Britain.

CHARLES W. LANHAM, *Primary Examiner.*
JOHN F. CAMPBELL, *Examiner.*